W. O. STARK.
FRICTION DRIVING AND STEERING MECHANISM.
APPLICATION FILED AUG. 20, 1913.

1,135,218.

Patented Apr. 13, 1915.
2 SHEETS—SHEET 1.

WITNESSES:

INVENTOR:
William O. Stark
By Michael J. Stark,
ATTORNEYS

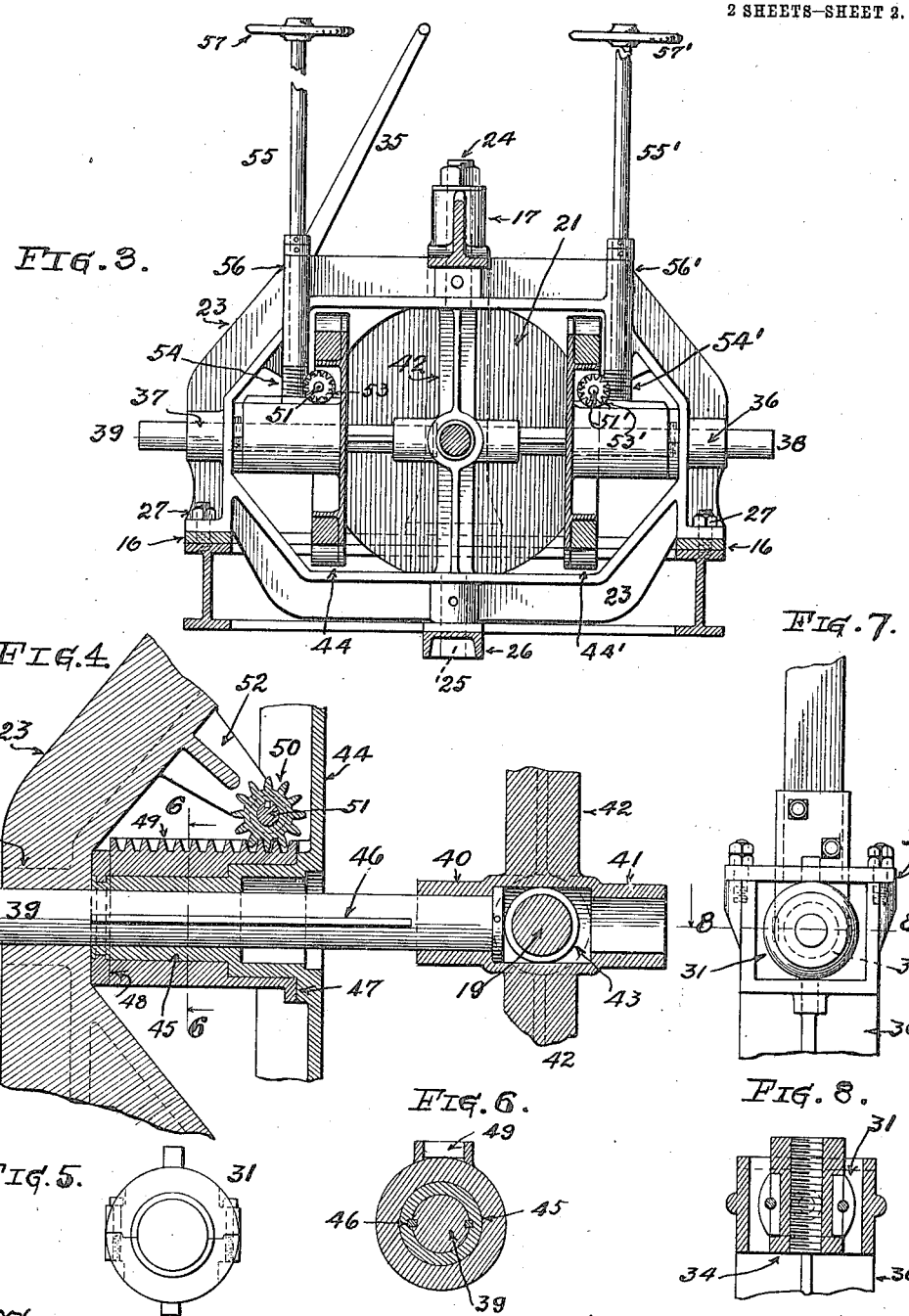

UNITED STATES PATENT OFFICE.

WILLIAM O. STARK, OF CHICAGO, ILLINOIS, ASSIGNOR TO BULLOCK TRACTOR COMPANY, A CORPORATION OF ILLINOIS.

FRICTION DRIVING AND STEERING MECHANISM.

1,135,218.  Specification of Letters Patent.  Patented Apr. 13, 1915.

Application filed August 20, 1913. Serial No. 785,674.

*To all whom it may concern:*

Be it known that I, WILLIAM O. STARK, a resident of Chicago, in the county of Cook and State of Illinois, a citizen of the United States of America, have invented certain new and useful Improvements in Friction Driving and Steering Mechanism; and I do hereby declare that the following description of my said invention, taken in connection with the accompanying sheets of drawings, forms a full, clear, and exact specification, which will enable others skilled in the art to which my said invention appertains to make and use the same.

This invention has general reference to friction driving mechanism for self-propelled vehicles and it is especially adapted for the use in tractors of the endless track type of combined propelling and steering mechanism. In this type of tractors the machine is steered by slowing one or the other of a pair of endless track chains which are operated by my present invention, or by arresting the movement of one of said endless track chains and thereby to divert the machine from its course.

This invention consists, essentially, in the novel and peculiar combination of parts and details of construction as hereinafter first fully set forth and described and then pointed out in the claims.

Figure 1:
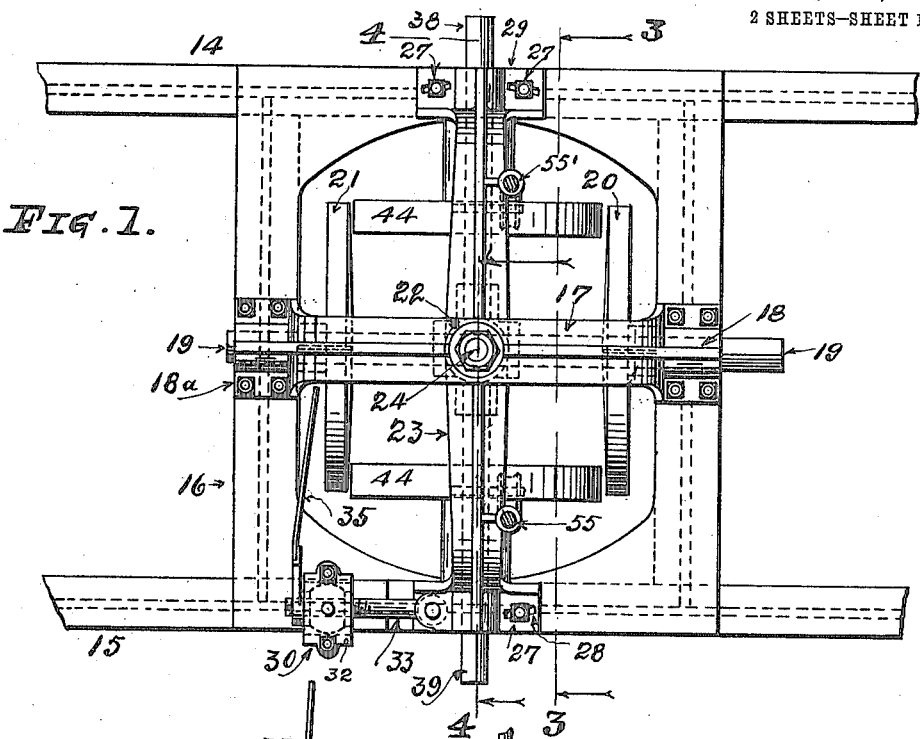
Figure 2:
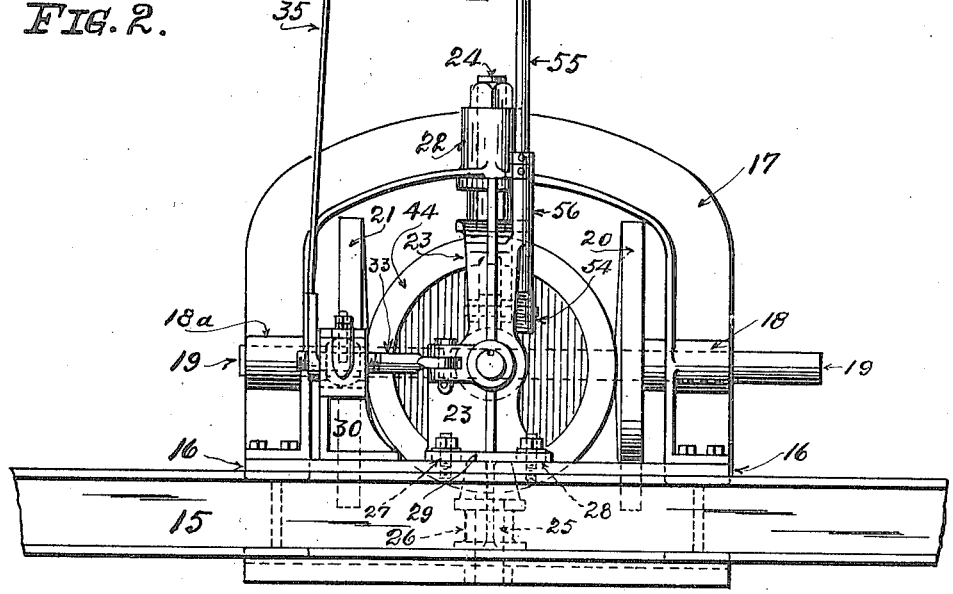

In the drawings already referred to, which serve to illustrate this invention more fully and form part of this specification, Figure 1 is a plan view of this improved friction gearing. Fig. 2 is an end-elevation of the same. Fig. 3 is a sectional elevation on line 3—3 of Fig. 1. Fig. 4 is a similar view on an increased scale of a fragment of the mechanism shown in Fig. 3, on line 4—4 of Fig. 1. Fig. 5 is an end-view of one of the bearings employed in this mechanism on line 6—6 of Fig. 4. Fig. 6 is a transverse section of the sliding mechanism by which the friction driven disks are being laterally moved. Fig. 7 is an end-elevation of a fragment of the device by means of which the driven friction disks are caused to engage one or the other of the driver friction disks. Fig. 8 is a sectional plan view of a portion of the same, on line 8—8 of Fig. 7.

Like parts are designated by the same characters and symbols of reference in all the figures.

In these drawings the reference numerals 14—15, designate two longitudinal I-beams of a structure forming part of the sub frame of a tractor, upon which there is located an open bed-plate 16, upon which is mounted an arcuated standard 17 having in oppositely located uprights bearings 18, 18$^a$, to receive the main driving shaft 19, of any suitable motor mounted on the tractor, there being mounted on this main shaft two driving friction disks 20, 21, the driving flanks of which are facing each other.

At the apex of the arch of standard 17 there is a vertically disposed tubular boss 22, and at right angles to the standard 17 and movably fastened to the base-plate 16 there is a further arcuated standard 23 which latter standard has in its apex a pivot 24 engaging the tubular bearing 22 in the standard 17, and a further pivot 25, oscillating in a step-bearing 26, as indicated in Fig. 2. This standard is movably secured to the base-plate 16 by bolts 27 which pass through slot-holes 28, in the flanges 29 of said standard 23 and thereby permit of the oscillation of said standard within the compass of said slot-holes. This arcuated standard is oscillated by means including a standard 30, open at its upper end to receive a pivotally retained two-part clamp 31, Fig. 5, and closed by a cap 32. Clamp 31 receives a nut 34 which is internally screw-threaded with a very steep, preferably triple thread and it receives a correspondingly screw-threaded link 33 which engages the arcuated standard 23 at one end by an eye engaging a double eye formed on said standard 23. The pivoted nut proper is a tubular sleeve located rotatably in said clamp 31 and it has at its projecting end a handle-bar 35, Figs. 1 and 2, by which it is oscillated. This causes the screw-threaded shaft to move laterally and thereby to oscillate the entire arcuated standard 23 with its appurtenants. At opposite sides of the arcuated standard 23 are provided bearings 36, 37, to receive one end of shafts 38, 39, the opposite ends being journaled in bearings 40, 41, formed in a cross or spider 42, cast preferably integrally with the arcuated standard 23, there being centrally in said cross a further bearing 43 for the main shaft 19.

Upon each of the shafts 38 and 39 is located a driven friction disk, and since these devices and their operating mechanism are alike, a description of one will suffice. This friction driven disk 44 has a tubular sleeve, 45, by which it is keyed to the shaft 39, by two feathers 46 to enable the disk to slide laterally on said shaft. Upon this sleeve and between shoulders 47, 48, thereon there is located a rack 49 the teeth of which mesh with those of a pinion 50, Fig. 4, which pinion is keyed to one end of a shaft 51, rotating in a bracket-bearing 52, formed on said arcuated standard 23, there being at the other end a worm-wheel 53, Fig. 3, that is engaged by a worm 54, formed at the lower end of a vertically disposed shaft 55, rotating in a tubular bearing 56, formed on the standard 23. This shaft 55 carries on its upper end a hand wheel 57 by which said shaft 55 is rotated. It will now be observed that there are two of these driven friction disks and appurtenants, the object of which will be hereinafter described, both sets being designated by the same reference numerals, and a prime (') added thereto to indicate the second set.

The operation of the mechanisms hereinbefore described is essentially, as follows: The main shaft 19 being rotated, a like rotative movement is communicated to the two driver disks 20, 21, which face each other and rotate in the same vertical planes and do not change their direction of revolution. In order to connect the two driven disks to the drivers, the handle-bar 35 is moved in one or the other direction to rotate the nut 34 and thereby move the pivoted arcuated standard in a corresponding direction to bring one of the driven disks in contact with the proper driver disk in front, and the other driven disk in contact with the opposing driver disk in the rear of the main driving shaft, thereby rotating both driven shafts in the same direction. By moving the hand-lever 35 in the opposing direction, the driven disks are thrown in a corresponding direction and thereby the rotation of the shafts 38, 39, reversed.

In order to change the speed of the two driven disks either one or both of the hand wheels 57 are rotated. This will cause the corresponding driven disk or disks to be moved toward or away from the center of the driving disks, a movement toward the center causing a decrease of speed, and a movement in the opposite direction producing the opposing result. Thus when this mechanism is employed in a tractor of the endless track type one of these endless tracks can be caused to move faster than the other and thus the machine steered in either direction and backed if necessary by manipulating the handle-bar 35.

I now desire to call attention to the fact that the two driven disks 44 are of such a diameter that they nearly touch the two driving disks 20, 21, when in disengaged or intermediate inoperative position, so that but a very slight oscillatory movement of the arcuate, pivoted, standard 23 is necessary to establish driving contact between the driver and the driven friction disks. The bearings in which the shaft 19 rotates are not such a close or snug fit but that these shafts will readily yield to this slight lateral movement in said bearings without affecting the operativeness of the device. In Fig. 1, the distance between the two driving friction disks is purposely somewhat exaggerated in order to more clearly demonstrate the fact that in inoperative position, the peripheries of the driven friction disks are not in contact with the flanks of the driving disks.

I, furthermore, desire to call attention to the fact that each of the two driven friction disks is provided with its own mechanism for moving it laterally on its shaft, which is an important feature in a driving mechanism of the nature described since it permits of increasing or decreasing the rotative speed of one driven disk without affecting the rotative speed of the other of said driven disks.

I have heretofore described the preferred embodiment of this present invention, but I desire it understood that many details thereof may be changed and parts omitted without departing from the scope of this invention which is fully pointed out in the subjoined claims.

Having thus fully described this invention, I claim as new and desire to secure by Letters Patent of the United States—

1. Friction driven propelling and steering mechanism for self-propelled vehicles, including, in combination, a pair of rotatable driving disks, a pair of co-acting driven disks located between said driving disks and constructed to contact, one with one of said driving disks and the other with the opposing driving disk, means for changing the relation of the said driving disks with respect to said driven disks to change the direction of rotation of the latter disks, and means for changing the positions of said driven disks with respect to said driving disks, independently of each other.

2. In friction driving mechanism for auto vehicles, a main shaft, an arcuate standard, bearings on said standard constructed to receive said main shaft, a pair of oppositely facing friction disks secured to said main shaft, an arcuate standard pivotally connected to, and within the first said arcuate standard, shafts in the latter, pivoted standard, driven friction disks mounted on said shafts, and mechanism for oscillating said pivoted arcuate standard.

3. In friction driving mechanism for auto vehicles, in combination, a main shaft, an arcuate standard, bearings on said standard constructed to receive said main shaft, a pair of oppositely facing friction disks secured to said main shaft, an arcuate standard pivotally connected to, and within the first-mentioned standard, shafts in the latter standard, driven friction disks mounted on said shafts between the said driving disks and means for moving each of said driven disks laterally on its shaft to change its speed of rotation independently of the other of said driven disks.

4. In friction driving mechanism for auto vehicles means for changing the direction of movement of said vehicle, including an arcuate standard, a main driving shaft, bearings in said standard for said main driving shaft, two oppositely facing driving disks mounted on said main driving shaft, a further standard pivotally mounted in said arcuate standard, a further standard, a rotatable pivoted nut located in said standard, a screw-threaded shaft connected at one end to said pivoted standard and constructed to engage said pivoted nut, and a handlebar on said nut constructed to rotate said nut.

5. In friction driving mechanism for auto vehicles, means for changing the speed of said vehicle, including, in combination, an arcuate standard, a main driving shaft, bearings on said standard for said main shaft, two oppositely facing friction driving disks mounted on said main driving shaft, a further standard at right angles to said arcuate standard, bearings in said second standard, shafts in said bearings, a driven friction disk on each of these latter shafts, said disks having each a shouldered hub, a rack located on said hub between said shoulders, a pinion constructed to engage said rack and worm gearing constructed to rotate said pinion.

6. Friction driving mechanism for auto vehicles, including a pair of oppositely located rotatable driving disks, a pair of driven disks operatively located between said driving disks, and means for changing the position of each driven disk independently of the other of said driven disks, said latter means including a shaft on which the driven disk is slidably mounted and adapted for rotation with said shaft, said driven disk having a comparatively long hub, said hub having shoulders, a toothed rack-bar loosely located on said hub between said shoulders, a pinion constructed to engage said rack, and means for rotating said pinion to impart endwise movement to said driven disk while the latter disk is being rotated.

In testimony that I claim the foregoing as my invention I have hereunto set my hand in the presence of two subscribing witnesses.

WILLIAM O. STARK.

Witnesses:
A. N. RUSIE,
MICHAEL J. STARK.

Copies of this patent may be obtained for five cents each, by addressing the "Commissioner of Patents, Washington, D. C."